(12) United States Patent
Zhu et al.

(10) Patent No.: US 11,305,335 B2
(45) Date of Patent: Apr. 19, 2022

(54) CURING AGENT FOR WATER GLASS MOLDING AND MANUFACTURING METHOD AND USE THEREOF

(71) Applicant: JINAN SHENGQUAN GROUP SHARE-HOLDING CO., LTD., Shandong (CN)

(72) Inventors: Jianxun Zhu, Shandong (CN); Huimin Yao, Shandong (CN)

(73) Assignee: JINAN SHENGQUAN GROUP SHARE-HOLDINGS CO., LTD, Shandong (CN)

( * ) Notice: Subject to any disclaimer, the term of this patent is extended or adjusted under 35 U.S.C. 154(b) by 611 days.

(21) Appl. No.: 16/073,569

(22) PCT Filed: Feb. 4, 2017

(86) PCT No.: PCT/CN2017/072892
§ 371 (c)(1),
(2) Date: Nov. 30, 2018

(87) PCT Pub. No.: WO2017/133685
PCT Pub. Date: Aug. 10, 2017

(65) Prior Publication Data
US 2019/0388960 A1  Dec. 26, 2019

(30) Foreign Application Priority Data
Feb. 5, 2016 (CN) .......................... 201610082019.4

(51) Int. Cl.
| B22C 1/18 | (2006.01) |
| B22C 9/02 | (2006.01) |
| B22C 1/10 | (2006.01) |
| C04B 14/06 | (2006.01) |
| C04B 24/02 | (2006.01) |
| C04B 24/04 | (2006.01) |
| C04B 24/32 | (2006.01) |
| C04B 28/26 | (2006.01) |
| C04B 40/00 | (2006.01) |
| C04B 103/10 | (2006.01) |
| C04B 111/00 | (2006.01) |

(52) U.S. Cl.
CPC ............... *B22C 1/188* (2013.01); *B22C 1/10* (2013.01); *B22C 1/181* (2013.01); *B22C 9/02* (2013.01); *C04B 14/066* (2013.01); *C04B 24/02* (2013.01); *C04B 24/045* (2013.01); *C04B 24/32* (2013.01); *C04B 28/26* (2013.01); *C04B 40/0039* (2013.01); *C04B 2103/10* (2013.01); *C04B 2111/00939* (2013.01)

(58) Field of Classification Search
CPC ..... C04B 14/066; C04B 24/02; C04B 24/045; C04B 24/32; C04B 28/26; C04B 40/0039; C04B 14/06; C04B 2103/10; C04B 2111/00939; B22C 1/10; B22C 1/181; B22C 1/188; B22C 9/02
See application file for complete search history.

(56) References Cited

U.S. PATENT DOCUMENTS

| 3,137,046 A | 6/1964 | Barlow et al. |
| 3,881,947 A | 5/1975 | Palmer |
| 5,474,606 A | 12/1995 | Twardowska et al. |
| 5,582,232 A | 12/1996 | Bambauer et al. |
| 2008/0099180 A1 | 5/2008 | Weicker et al. |
| 2010/0107509 A1* | 5/2010 | Guiselin ................. C09D 7/62 51/298 |
| 2011/0073270 A1* | 3/2011 | Stotzel ..................... B22C 3/00 164/47 |
| 2015/0246387 A1 | 9/2015 | Bartels et al. |

FOREIGN PATENT DOCUMENTS

| CN | 1262154 A | 8/2000 |
| CN | 101027147 A | 8/2007 |
| CN | 101842175 A | 9/2010 |
| CN | 102909313 A | 2/2013 |
| CN | 104226890 A | 12/2014 |
| CN | 104736270 A | 6/2015 |
| CN | 104923715 A | 9/2015 |
| CN | 105665615 A | 6/2016 |
| DE | 19923779 A1 | 11/2000 |
| DE | 19925167 A1 | 12/2000 |
| JP | S4993216 A | 9/1974 |
| JP | 2015532209 A | 11/2015 |
| WO | WO2014059968 A2 | 4/2014 |
| WO | WO2014059969 A2 | 4/2014 |

OTHER PUBLICATIONS

International Preliminary Report on Patentability with English translation issued in PCT/CN2017/072892, dated Aug. 16, 2018, 13 pages.
International Search Report and Written Opinion with English translation issued in PCT/CN2017/072892, dated May 5, 2017, 17 pages.
Zhou et al., "Discussion on the Reinforcement of Heating Hardening Sodium Silicate Sand and Improvement of Collapsibiilty", Modern Machinery, No. 2, Jun. 30, 2001, pp. 69-71 (With English Abstract).

(Continued)

*Primary Examiner* — Shuangyi Abu Ali
(74) *Attorney, Agent, or Firm* — Faegre Drinker Biddle & Reath LLP

(57) ABSTRACT

A curing agent for water glass molding comprises: ester; amorphous silica; and water. The amorphous silica is formed by means of a pyrolysis method and/or by means of a precipitation method. Also disclosed is a use of the curing agent for water glass molding in preparation of a casting mold and a mold core. Respective components of the curing agent comprising ester, amorphous silica and water are mixed at a high speed to form a suspension. Next, the suspension is applied to prepare a water glass self-hardening sand. The curing agent does not cause powder contamination, and can be measured and added conveniently. Also disclosed are a manufacturing method of the curing agent for water glass molding and a water glass self-hardening sand.

3 Claims, No Drawings

(56) References Cited

OTHER PUBLICATIONS

Supplemental European Search Report issued in European application EP17747005.1, dated Jul. 12, 2019, 10 pages.

* cited by examiner

CURING AGENT FOR WATER GLASS MOLDING AND MANUFACTURING METHOD AND USE THEREOF

CROSS-REFERENCE TO RELATED APPLICATION

This application is a national phase application of PCT Application No. PCT/CN2017/072892, internationally filed Feb. 4, 2017, which claims priority to Chinese Application No. 201610082019.4, filed Feb. 5, 2016, both of which are herein incorporated by reference in their entireties.

TECHNICAL FIELD

The present invention relates to the technical field of the modification of casting sand, in particular to a curing agent for casting water glass, preparation method and use thereof.

BACKGROUND

Casting is the basic part in equipment manufacturing industry, therefore the development of the foundry industry represents the production strength of a country. According to statistics in 2008, China, which is the world's largest casting country, produces 33.5 million tons of castings per year. Most of these castings are produced by using self-hardening sand to prepare casting molds and mold cores.

Casting molds for preparing metal bodies are prepared essentially in two forms. The first is to form the so-called mold cores or molds. The casting mold which is essentially the negative mold of the casting to be prepared is assembled from the mold cores or molds. The second is to form hollow bodies, known as feeders, which act as equilibration reservoirs. The reservoirs take up liquid metal, with appropriate measures ensuring that the metal remains in the liquid phase for longer time than the metal which is present in the casting mold forming the negative mold. When the metal solidifies in the negative mold, the liquid metal may flow from the equilibration reservoir in order to compensate for the volume contraction occurring on solidification of the metal.

Casting molds consist of refractory materials, for example silica sand, whose grains are bound together by a suitable binder after molding in order to ensure sufficient mechanical strength of the casting mold. The refractory mold base material which has been treated with a suitable binder is also used for preparing casting molds. The refractory mold base material is preferably in a form which is capable of flowing, so that it can be introduced into a suitable hollow mold and consolidated therein. The binder produces firm cohesion between the particles of the mold base material, so that the casting mold is given a necessary mechanical stability.

Casting molds have to meet various requirements. With respect to the casting process itself, they firstly have to have sufficient stability and heat resistance to accommodate the liquid metal into the hollow mold formed by one or more (part) casting molds. After the commencement of the solidification, the mechanical stability of the casting mold is ensured by a solidified metal layer which forms along the wall of the hollow mold. The material of the casting mold then has to decompose under the effect of the heat given off by the metal in a manner that it loses its mechanical strength, i.e. cohesion between individual particles of the refractory material is eliminated. This is achieved, for example, by decomposition of the binder under the effect of heat. After cooling, the solidified casting is shaken, and in the ideal case the material of the casting molds disintegrates again into fine sands which can be poured from the hollow space of the metal mold.

To produce a casting mold, it is possible to use either an organic or inorganic binder which can in each case be cured by a cold or hot method. Casting is one of the most polluting industries in the machinery manufacturing industry, in which the binder for molding cores is the main source of pollution. At present, organic binders such as furan resin and urethane resin are widely used in foundries. Those organic binders burn and decompose when the liquid metal is introduced into the casting mold and may give off toxic gases and harmful substances such as toluene, xylenes, phenol, carbon monoxide and suspended substance. The water glass self-hardening sand has attracted more people's attention with the increasing requirements of the national laws and regulations on the environmental protection of foundry.

In order to avoid the emission of decomposition products during the casting process, it is necessary to use binders which are based on inorganic materials or contain at most a very small amount of organic compounds. An exothermic feeder composition which contains an alkali metal silicate as binder is described in DE19925167A. Furthermore, binder systems which are self-curing at room temperature have been developed. Such a system based on phosphoric acid and metal oxides is described, for example, in U.S. Pat. No. 5,582,232A1. There is also an inorganic binder system which is cured at relatively high temperatures, for example in a hot tool. Such a hot-curing binder system is, for example, known from U.S. Pat. No. 5,474,606A1 in which a binder system consisting of alkali metal water glass and aluminium silicate is described.

Typically, water glass is an inorganic binder synthesized from silica sand and soda ash. It is one of the most resource-rich substances on the earth and is the casting resin which has the least impact on the environment. The addition amount of water glass has been reduced to 1.8-3.0% since 1999 in which year the novel water glass was produced till now. It has advantages of high strength, good collapsibility, and the used sand can be recycled with a recycling rate of 80-90%, and the use time is adjustable. It can be used in either mechanized modeling production lines or single-piece small batch production.

The water glass, which is a casting binder with wide application prospects, can meet the requirements in technology, economy and ecology excellently when used as a molding (core) sand binder. However, the mechanical properties of the water glass binder are lower than that of organic resins when added in the same amount since the ordinary water glass has a specific strength of 0.3 MPa (1%) or less. In addition, the water glass sand has a poor collapsibility, which drags its promotion and application. However, the specific strength of the water glass can be increased in the case of limiting its amount by adding a water glass enhancer.

CN104226890A discloses a water glass enhancer for casting and a preparation method thereof. The water glass enhancer comprises the following raw materials in parts by weight: 4-5 parts of polyvinyl alcohol; 0-0.5 parts of fluorosilicate; 0.1-8 parts of alcohol saccharides; and 0.1-2 parts of inorganic acid. The novel water glass enhancer can greatly reduce the amount of water glass to be added and can significantly increase the strength of the water glass sand, improve its mechanical properties, and make it more widely used. However, there are limited improvements on the strength after storage for a long period of time after molding.

CN101027147A discloses a mixture of molding materials for producing casting molds for metal processing. For producing casting molds, a refractory molding base material and a binder based on water glass are used, and a certain proportion of particulate metal oxide is added into the binder, wherein the particulate metal oxide is selected from the group consisting of silicon dioxide, aluminium oxide, titanium oxide and zinc oxide. Although it has greatly improved the strength of the molded casting mold, the addition of the solid powder is poor in continuousness, and the dust flying during the feeding deteriorates the working environment. Especially when the ester hardened water glass sand is used, the separate addition of multi-component complicates the operations, which is not conducive to industrialization.

A preparation and characterization of modified nano-silica-acrylate polyurethane emulsion, which has significant improvement on the hardness, water absorption and alcohol resistance of the film, was reported in Yu Xinwei et al. (Yu Xinwei, et al. Preparation and Characterization of Nano-Silica-Acrylate Polyurethane Emulsion, Electroplating and Finishing, No. 22, 2014). However, the use of this emulsion in the preparation of water glass self-hardening sand is not disclosed therein. The emulsion is not used as an enhancer for casting water glass.

Therefore, the development of an enhancer for casting water glass has long-term significance for the promotion and application of the water glass self-hardening sand, in which the enhancer can not only improve the mechanical properties of the water glass sand, but also avoid powder pollution, so that the operations are simple, and the measurement, addition and application are convenient, and an industrial production is achieved.

SUMMARY OF INVENTION

Aiming at the deficiencies of the prior art, the first purposes of the present invention is to provide a novel curing agent for casting water glass, comprising an ester, an amorphous silica and water; wherein the amorphous silica is a pyrogenic amorphous silica and/or a precipitated amorphous silica.

The curing agent of the present invention can be used for preparing casting molds or mold cores, that is, the curing agent for casting water glass is used as a liquid enhancer for water glass self-hardening sand.

In the present invention, the components of the curing agent are mixed uniformly to formulate a suspension, which is then used in the preparation of water glass self-hardening sand, thereby one-time addition of the curing agent for casting water glass is achieved without powder pollution. The operations are simple, the measurement, addition and application are convenient, and an industrial production is achieved. In addition, the strength of the water glass sand is significantly increased by the use of the curing agent in the preparation of casting molds and casting cores, and the strength thereof still remains at a high level after storage for a long time after molding, greatly improving the mechanical properties of the casting molds or casting cores.

"Comprising" as described in the present invention means that in addition to said components, other components which impart different characteristics to the curing agent may also be included. In addition, the "comprising" as described in the present invention may also be replaced by a closed expression "being" or "consisting of".

According to the present invention, the curing agent for casting water glass comprises a certain proportion of particulate amorphous silica, the particle size of which is preferably less than 50 µm, more preferably less than 10 µm, and particularly preferably less than 5 µm. The particle size can be determined by sieving analysis. The sieving residue on the sieve having a mesh size of 10 µm is particularly preferably less than 7% by weight, preferably less than 4% by weight.

According to the present invention, it is preferred to use any one of the pyrogenic amorphous silica or the precipitated amorphous silica or a mixture of at least two thereof as the particulate amorphous silica.

The pyrogenic amorphous silica or the precipitated amorphous silica is equally suitable for the curing agent for casting water glass according to the present invention. Wherein, the pyrogenic amorphous silica generally refers to an amorphous silica obtained by agglomeration from a gas phase at a high temperature; the pyrogenic amorphous silica can be prepared, for example, by flame hydrolysis of silicon tetrachloride, or by the reduction of quartz sand with coke or anthracite in an electrical arc furnace to form SiO gas, followed by oxidation to silica; the pyrogenic amorphous silica prepared by the electric arc furnace method may further contain carbon. The precipitated amorphous silica is obtained by reacting an aqueous solution of alkali metal silicate with an inorganic acid, and then, the precipitated amorphous silica is isolated from the precipitate thus produced, and dried and ground.

According to the present invention, the amorphous silica is preferably formed by pyrogenic decomposition of $ZrSiO_4$, which has a higher core weight than the amorphous silica from other sources when added in the same amount, indicating that the casting mold particles have a more compact accumulation.

According to the present invention, in the curing agent for casting water glass, the ester is any one selected from the group consisting of glyceryl monoacetate, glyceryl diacetate, glyceryl triacetate, ethylene glycol diacetate, propylene carbonate, dibasic esters, and a mixture of at least two thereof. The typical but non-limiting examples of the mixture is a mixture of glyceryl monoacetate and glyceryl diacetate, a mixture of glyceryl triacetate and ethylene glycol diacetate, and a mixture of glyceryl diacetate, glyceryl triacetate, ethylene glycol diacetate and propylene carbonate.

According to the present invention, the water in the curing agent for casting water glass may be tap water or the like, which is not particularly limited herein.

According to the present invention, in the curing agent for casting water glass, the ester and the amorphous silica are mixed in a suitable weight ratio, and a typical but non-limiting weight ratio is (0.3-4):1. The applicant states that the above weight ratio of ester to amorphous silica is (0.3-4):1, covering specific values in the range, for example, 0.3:1, 0.4:1, 0.45:1, 0.68:1, 0.8:1, 0.92:1, 1:1, 1.2:1, 1.3:1, 1.6:1, 1.8:1, 2:1, etc., as well as specific point values between the above values, such as 0.7:1, 1.4:1, etc. The specific point values included within the range are no longer listed exhaustively herein due to the limitation of space and for concise considerations. According to the present invention, however, the weight ratio of the ester to the amorphous silica is preferably (0.68-2):1.

According to the present invention, the curing agent for casting water glass comprises 20-40% of the ester; 30-60% of the amorphous silica; and 5-30% of water by mass fraction. The applicant states that the content ranges of each component described above cover specific point values in those ranges, for example, the ester may account for 20%, 22%, 23%, 23.5%, 24%, 25%, 26.5%, 27%, 28%, 29%, 30%, etc. of the curing agent by mass fraction; the amorphous silica may account for 30%, 32%, 33%, 33.5%, 34%, 35%, 36.5%, 37%, 38%, 39%, 40%, 41%, 42%, 43%, 43.5%, 44%, 45%, 46.5%, 47%, 48%, 49%, 50%, 51%, 52%, 53%, 54%, 55%, 56%, 58%, 60%, etc. of the curing agent by mass fraction; the water may account for 5%, 6%, 8%, 10%, 12%, 13%, 13.5%, 14%, 15%, 16.5%, 20%, 22%, 23%, 25%, 28%, 30%, etc. of the curing agent by mass fraction, as well as specific point values between the above values. The specific point values included within the ranges are no longer listed exhaustively herein due to the limitation of space and for concise considerations.

According to the present invention, in a typical but non-limiting way, the curing agent may comprise 20% of ester; 50% of amorphous silica; 30% of water; or 23% of ester; 49% of amorphous silica; and 28% of water, and so on.

According to the present invention, the curing agent for casting water glass may further comprise an alcohol, which is mainly used for accelerating the dissolution of each component of the curing agent, and other known organic solvents may also be used. The typical but non-limiting alcohol solvent may be any one selected from the group consisting of ethanol, methanol, propanol, isopropanol, butanol, isobutanol, benzyl alcohol, ethylene glycol, polyethylene glycol, and a mixture of at least two thereof, although ethanol is preferred. Ethanol is capable of making the suspension of the curing agent more uniform and stable when used as an organic solvent. Ethanol is the best choice for the stability, economy and environmental protection of the suspension.

According to the present invention, the curing agent may comprise 20-40% of the ester; 30-60% of the amorphous silica; 2-12% of the alcohol; and 3-18% of water by mass fraction. The typical but non-limiting combination is 20% of ester; 60% of amorphous silica; 2% of alcohol; and 18% of water; or, 32% of ester; 50% of amorphous silica; 3% of alcohol; and 15% of water; or, 35% of ester; 48% of amorphous silica; 5% of alcohol; and 12% of water, etc.

The second purpose of the present invention is to provide a method for preparing the curing agent for casting water glass, comprising the following steps:
(1) first, adding the ester weighed according to the ratio into a stirring tank of a high-speed mixer and stirring;
(2) inputting the water weighed according to the ratio, and optionally, inputting the alcohol weighed according to the ratio; adjusting the rotation speed to 800 rpm or more, and then adding the amorphous silica, and stirring for another 10-20 minutes to make it form a suspension to obtain the curing agent for casting water glass.

According to the present invention, the ester, water, amorphous silica or alcohol used in the preparation method is weighted according to the weight ratio, the mass fraction and the specific selection in the first purpose of the present invention as described above, which is no longer repeated here.

In the present invention, each component of the curing agent comprising an ester, an amorphous and water is subjected to high-speed shearing and uniform mixing to formulate a homogeneous suspension. During the preparation of water glass self-hardening sand, the homogeneous suspension can be added in one time, which effectively avoid powder pollution. The operations are more simple and the measurement, addition and application are convenient, thus it can be used in industrial production in large scale, greatly improving the production efficiency.

According to the present invention, the rotation speed in step (2) is set to 800 rpm or more, for example, it can be appropriately adjusted within the range of 900-1000 rpm, for example, 950 rpm, 955 rpm, 960 rpm, 965 rpm, 970 rpm, 980 rpm, 985 rpm, 990 rpm, 1000 rpm, as well as specific point values between the above values. The specific point values included within the range are no longer listed exhaustively herein due to the limitation of space and for concise considerations.

According to the present invention, the method for preparing the curing agent for casting water glass may comprise, for example, the following steps:
(1) first, adding the ester weighed according to the ratio into a stirring tank of a high-speed mixer and stirring;
(2) inputting the water weighed according to the ratio; adjusting the rotation speed to 800 rpm or more, and then adding the amorphous silica, and stirring for another 10-20 minutes to make it form a suspension to obtain the curing agent for casting water glass.

As a further preferred technical solution, the preparation method of the curing agent for casting water glass may comprise, for example, the following steps:
(1) first, adding the ester weighed according to the ratio into a stirring tank of a high-speed mixer and stirring;
(2) inputting the water and the alcohol weighed according to the ratio; adjusting the rotation speed to 800 rpm or more, and then adding the amorphous silica, and stirring for another 10-20 minutes to make it form a suspension to obtain the curing agent for casting water glass.

According to the present invention, during the preparation of the curing agent for casting water glass, it is preferred to first add the ester into the stirring tank for stirring, and then add other components. The order of addition can more effectively avoid dust pollution resulted during the mixing of the materials, and is more favorable for the uniformity of the slurry.

The third purpose of the present invention is to provide a use of the curing agent for casting water glass, which is to use the curing agent described in the first purpose of the present invention for preparing a casting mold and a mold core.

According to the present invention, the casting mold and the mold core are preferably used for metal casting, in particular for iron and steel casting.

During the preparation of casting molds and casting cores in the present invention, the addition of the curing agent can not only increase the strength of the water glass sand, but also improve the mechanical properties thereof, and can effectively avoid powder pollution, so that the operations are simple and the measurement, addition and application are convenient, and an industrial production can be achieved, which has a long-term significance for the promotion and application of the water glass self-hardening sand.

The fourth purpose of the present invention is to provide a water glass self-hardening sand comprising 95-98% of quartz sand; 1.8-2.5% of water glass; and 0.6-1.6% of a liquid enhancer by mass fraction; wherein the liquid enhancer is the curing agent for casting water glass according to the first purpose of the present invention.

According to the present invention, the water glass self-hardening sand comprises 95-98% of quartz sand; 1.8-2.5% of water glass; and 0.6-1.6% of a liquid enhancer by mass fraction. The typical but non-limiting combinations thereof are: 96% of quartz sand; 2.5% of water glass; 1.5% of liquid enhancer; or, 96% of quartz sand; 2.4% of water glass; 1.6% of liquid enhancer; or, 97.2% of quartz sand; 2.2% of water glass; 0.6% of liquid enhancer; or, 97.5% of quartz sand;

1.8% of water glass; 0.7% of liquid enhancer, etc. The specific point values included within the range are no longer listed exhaustively herein due to the limitation of space and for concise considerations.

Compared with the prior art, the present invention has at least the following beneficial effects:

(1) In the present invention, each component of the curing agent comprising an ester, an amorphous and water is subjected to high-speed shearing and mixing to formulate a suspension, which is then used in the preparation of water glass self-hardening sand, thereby one-time addition of the curing agent for casting water glass is achieved without powder pollution. The operations are simple, the measurement, addition and application are convenient, and an industrial production is achieved.

(2) In the present invention, the strength of the water glass sand is significantly increased by the addition of the amorphous silica into the curing agent, especially the addition of silicon micropowder, and the strength still remains at a high level after storage for a long time after molding, which greatly improves the mechanical properties of the casting molds or casting cores, and allows the casting molds or casting cores to achieve a tensile strength of 0.605 MPa after molding for 24 h.

DETAILED DESCRIPTION

In order to facilitate the understanding of the present invention, the following examples are exemplified in the present invention. It should be understood by those skilled in the art that the examples are only to facilitate the understanding of the present invention and should not be construed as specific limitations to the present invention.

Example 1

| Components | ratios (mass/g) |
|---|---|
| glyceryl diacetate | 30 |
| ethylene glycol diacetate | 60 |
| glyceryl triacetate | 300 |
| propylene carbonate | 10 |
| silicon micropowder | 600 |
| ethanol | 30 |
| water | 50 |

Preparation Process

1. Glyceryl diacetate, ethylene glycol diacetate, glyceryl triacetate and propylene carbonate were weighted and added into a stirring tank of a high-speed mixer and stirred for 60 min;

2. Ethanol and water were added, the stirring speed was adjusted to 900-1100 rpm, then silicon micropowder was added, and the mixture was stirred for another 10 min to obtain a liquid enhancer a for water glass self-hardening sand (i.e., the curing agent for casting water glass of the present invention).

Example 2

(1) The components are compounded according to Example 1, except that ethanol was replaced by methanol;
(2) The preparation process was the same as that in Example 1.

Example 3

(1) The components are compounded according to Example 1, except that ethanol was replaced by propanol;
(2) The preparation process was the same as that in Example 1.

Example 4

(1) The components are compounded according to Example 1, except that ethanol was replaced by isopropanol;
(2) The preparation process was the same as that in Example 1.

Example 5

(1) The components are compounded according to Example 1, except that ethanol was replaced by butanol;
(2) The preparation process was the same as that in Example 1.

Example 6

(1) The components are compounded according to Example 1, except that ethanol was replaced by benzyl alcohol;
(2) The preparation process was the same as that in Example 1.

Example 7

(1) The components are compounded according to Example 1, except that ethanol was replaced by ethylene glycol;
(2) The preparation process was the same as in that Example 1.

Example 8

(1) The components are compounded according to Example 1, except that ethanol was replaced by polyethylene glycol;
(2) The preparation process was the same as that in Example 1.

Example 9

(1) The components are compounded according to Example 1, except that no ethanol was added;
(2) The preparation process was the same as that in Example 1.

The liquid enhancers for water glass self-hardening sand as prepared in Examples 1-9 were tested for their stability, and the results were shown in Table 1.

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Stability | 99% | 83% | 78% | 81% | 83% | 92% | 85% | 84% | 90% |

Stability test standard: Refer to JB/T5107-91 "Coatings for Sand Casting"

Operation Steps

A representative curing agent sample was poured into a dry graduated cylinder to a level of 100 ml. The sample was specifically left in a static state for 5 h according to the detection requirements for different types of curing agents. The area of the clear layer was red, correct to 1 mL.

Calculation Result $$C = \frac{100-V}{100} \times 100\%$$

wherein:

C—suspending rate of the curing agent, %

V—the area of the clear layer on the upper part of the curing agent column in the graduated cylinder, ml It was shown in table 1 that the suspension of the curing agent was allowed to be more stable in Example 1 in which case ethanol was used as an organic solvent compared to Examples 2-8; and the prepared liquid enhancers were allowed to form suspensions with stronger stability in Examples 1-8 in which cases alcohol solvents were added compared to Example 9.

Example 10

| Components | ratios (mass/g) |
|---|---|
| glyceryl diacetate | 37.5 |
| ethylene glycol diacetate | 75 |
| glyceryl triacetate | 375 |
| propylene carbonate | 12.5 |
| silicon micropowder | 500 |
| ethanol | 60 |
| water | 20 |

Preparation Process

1. Glyceryl diacetate, ethylene glycol diacetate, glyceryl triacetate and propylene carbonate were weighted and added into a stirring tank of a high-speed mixer and stirred for 60 min;
2. Ethanol and water were added, the stirring speed was adjusted to 900-1100 rpm, then silicon micropowder was added, and the mixture was stirred for another 10 min to obtain a liquid enhancer b for water glass self-hardening sand (i.e., the curing agent for casting water glass of the present invention).

Example 11

(1) The components are compounded according to Example 10, except that the addition amounts of the ester components were adjusted according to the followings;

| glyceryl diacetate | 30 |
|---|---|
| ethylene glycol diacetate | 70 |
| glyceryl triacetate | 400 |

(2) The preparation process was the same as that in Example 10, and a liquid enhancer c for water glass self-hardening sand (i.e., the curing agent for casting water glass of the present invention) was obtained.

The liquid enhancers for water glass self-hardening sand obtained from Examples 1 and 10-11 were used in preparing water glass self-hardening sand, with the following specific operations:

1000 g of standard sand from Dalin was weighted and added into a blade sand mixer for use in laboratory, 8.64 g of the liquid enhancer for water glass self-hardening sand was added, and the mixture was stirred for 1 min, 20 g of water glass SQ-1 was added, and stirred for 1 min, then the sand was produced, and a standard "8"-shaped test cube was made and tested for tensile strength at 1 h, 4 h and 24 h, and the results were shown in Table 2.

Comparative Example 1

(1) The components are compounded according to Example 1, except that no silicon micropowder, ethanol and water were added;

(2) The preparation process was the same as that in Example 1.

Comparative Example 2

(1) The components are compounded according to Example 10, except that no silicon micropowder, ethanol and water were added;

(2) The preparation process was the same as that in Example 10.

Comparative Example 3

(1) The components are compounded according to Example 11, except that no silicon micropowder, ethanol and water were added;

(2) The preparation process was the same as that in Example 11.

The organic esters obtained from Comparative Examples 1-3 were used in preparing water glass self-hardening sand, with the following specific operations:

1000 g of standard sand from Dalin was weighted and added into a blade sand mixer for use in laboratory, 7.5 g of organic ester SG-25 was added, and the mixture was stirred for 1 min, 30 g of water glass SQ-1 was added, and stirred for 1 min, then the sand was produced, and a standard "8"-shaped test cube was made and tested for tensile strength at 1 h, 4 h and 24 h according to the Executive Standard GB-2684, and the results were shown in Table 2.

TABLE 2

| NO. | Tensile Strength (MPa) | | |
|---|---|---|---|
| | 1 h | 4 h | 24 h |
| Ex. 1 | 0.410 | 0.553 | 0.596 |
| Comp. Ex. 1 | 0.279 | 0.476 | 0.483 |
| Ex. 10 | 0.402 | 0.540 | 0.586 |
| Comp. Ex. 2 | 0.309 | 0.513 | 0.527 |
| Ex. 11 | 0.394 | 0.512 | 0.605 |
| Comp. Ex. 3 | 0.300 | 0.497 | 0.535 |

By comparing Examples 1, 10-11 with Comparative Examples 1-3, respectively, it was shown that in Examples 1, 10-11, the organic ester components, which were incorporated with silicon micropowder, were used to formulate the liquid enhancer for water glass self-hardening sand to prepare water glass self-hardening sand, which had a significant improvement on tensile strength. The strength of the water glass self-hardening sand can be significantly increased after molding for 1 h. The strength of the water glass self-hardening sand prepared therefrom still remained at a relatively high level even after storage for a long time after molding. Thus, the mechanical properties of the casting mold and the mold core were greatly improved.

Example 12

| Components | ratios (mass/g) |
| --- | --- |
| glyceryl monoacetate | 90 |
| glyceryl triacetate | 300 |
| propylene carbonate | 10 |
| silicon micropowder | 600 |
| methanol | 30 |
| water | 50 |

The preparation process was the same as that in Example 1.

Example 13

| Components | ratios (mass/g) |
| --- | --- |
| glyceryl triacetate | 300 |
| propylene carbonate | 100 |
| silicon micropowder | 600 |
| propanol | 30 |
| water | 50 |

The preparation process was the same as that in Example 1.

Example 14

| Components | ratios (mass/g) |
| --- | --- |
| propylene carbonate | 400 |
| silicon micropowder | 600 |
| butanol | 30 |
| water | 50 |

The preparation process was the same as that in Example 1.

Example 15

| Components | ratios (mass/g) |
| --- | --- |
| propylene carbonate | 400 |
| silicon micropowder | 600 |
| water | 80 |

The preparation process was the same as that in Example 1.

Example 16

| Components | ratios (mass/g) |
| --- | --- |
| ethylene glycol diacetate | 112.5 |
| glyceryl triacetate | 375 |
| propylene carbonate | 12.5 |
| silicon micropowder | 500 |
| ethanol | 60 |
| water | 20 |

The preparation process was the same as that in Example 1.

Example 17

| Components | ratios (mass/g) |
| --- | --- |
| glyceryl diacetate | 60 |
| glyceryl triacetate | 410 |
| silicon micropowder | 500 |
| methanol | 60 |
| water | 20 |

The preparation process was the same as that in Example 1.

Example 18

| Components | ratios (mass/g) |
| --- | --- |
| glyceryl triacetate | 470 |
| silicon micropowder | 500 |
| propanol | 60 |
| water | 20 |

The preparation process was the same as that in Example 1.

The liquid enhancers for water glass self-hardening sand obtained from Examples 12-18 were used in preparing water glass self-hardening sand, with the following specific operations:

1000 g of standard sand from Dalin was weighted and added into a blade sand mixer for use in laboratory, 8.64 g of the liquid enhancer for water glass self-hardening sand was added, and the mixture was stirred for 1 min, 20 g of water glass SQ-1 was added, and stirred for 1 min, then the sand was produced, and a standard "8"-shaped test cube was made and tested for tensile strength at 1 h, 4 h and 24 h. Through the texting, the strength of the water glass self-hardening sand prepared by using the liquid enhancer for water glass self-hardening sand prepared therefrom was significantly increased after molding for 1 h, and the tensile strength was 0.395-0.408. The strength of the water glass self-hardening sand prepared therefrom still remained at a higher level even after storage for a long time after molding. After molding for 24 h, the tensile strength thereof could reach 0.586-0.605, greatly improving the mechanical properties of the casting mold and the mold core.

In addition, in the present invention, each component of the curing agent comprising an ester, an amorphous and water is subjected to high-speed shearing and mixing to formulate a slurry, which is then used in the preparation of water glass self-hardening sand, thereby a one-time addition of the curing agent for casting water glass is achieved without powder pollution. The operations are simple, the measurement, addition and application are convenient, and an industrial production is achieved.

The Applicant states that the present invention illustrates the detailed process equipment and process flow of the present invention by the above embodiments, however, the present invention is not limited to the above detailed process equipment and process flow, that is, it does not mean that the present invention must rely on the above detailed process equipment and process flow for implementation. It should be apparent to those skilled in the art that any modifications of the present invention, equivalent substitution of the various materials of the products of the present invention, addition of auxiliary components, selection of specific means, and the like, are all within the protection scope and disclosure scope of the present invention.

The invention claimed is:

1. A curing agent for casting water glass comprising 20-30% of an ester, 40-60% of an amorphous silica; 6-12% of an alcohol; and 10-18% of water by mass fraction; wherein the amorphous silica is a pyrogenic amorphous silica and/or a precipitated amorphous silica;

wherein the ester is any one selected from a group consisting of glyceryl monoacetate, glyceryl diacetate, glyceryl triacetate, ethylene glycol diacetate, propylene carbonate, dibasic esters, and a mixture of at least two thereof;

wherein the alcohol is any one selected from a group consisting of ethanol, methanol, propanol, isopropanol, butanol, isobutanol, benzyl alcohol, ethylene glycol, polyethylene glycol, and a mixture of at least two thereof.

2. The curing agent according to claim 1, wherein the alcohol is ethanol.

3. A method for preparing the curing agent for casting water glass according to claim 1, comprising the following steps: (1) first, adding the ester weighed according to the mass fraction into a stirring tank of a high-speed mixer and stirring; (2) inputting the water weighed according to the mass fraction, and inputting the alcohol weighed according to the mass fraction; adjusting rotation speed to 800 rpm or more, and then adding the amorphous silica, and stirring for 10-20 minutes to form a suspension to obtain the curing agent for casting water glass.

* * * * *